(12) United States Patent
Zhao et al.

(10) Patent No.: US 12,218,568 B2
(45) Date of Patent: Feb. 4, 2025

(54) SYSTEM FOR A GENERATOR SET

(71) Applicant: Cummins Power Generation Inc., Minneapolis, MN (US)

(72) Inventors: Dexiu Zhao, Shanghai (CN); Yongxing Lu, Shanghai (CN); Dongsheng Yan, Shanghai (CN)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 18/023,315

(22) PCT Filed: Aug. 5, 2021

(86) PCT No.: PCT/US2021/044697
§ 371 (c)(1),
(2) Date: Feb. 24, 2023

(87) PCT Pub. No.: WO2022/046383
PCT Pub. Date: Mar. 3, 2022

(65) Prior Publication Data
US 2023/0307992 A1    Sep. 28, 2023

(30) Foreign Application Priority Data
Aug. 27, 2020   (CN) .......................... 202021829115.9

(51) Int. Cl.
*H02K 7/18*       (2006.01)
*F02B 63/04*      (2006.01)
(Continued)

(52) U.S. Cl.
CPC ............. *H02K 7/18* (2013.01); *F02B 63/044* (2013.01); *F02N 11/006* (2013.01); *H02K 9/06* (2013.01);
(Continued)

(58) Field of Classification Search
CPC .......... H02K 7/18; H02K 11/20; H02K 11/30; H02K 9/06; H02K 17/42; H02K 47/20; F02B 63/044; F02N 11/006
See application file for complete search history.

(56) References Cited

U.S. PATENT DOCUMENTS

| 4,117,342 A | 9/1978 | Melley, Jr. |
| 4,136,432 A | 1/1979 | Melley, Jr. |

(Continued)

FOREIGN PATENT DOCUMENTS

| AU | 2015224409 A1 | 3/2016 |
| AU | 2019240735 B2 | 10/2019 |

(Continued)

OTHER PUBLICATIONS

U.S. Appl. No. 18/023,303, filed Feb. 24, 2023, Yan et al.
(Continued)

*Primary Examiner* — Tulsidas C Patel
*Assistant Examiner* — Thomas K Quigley
(74) *Attorney, Agent, or Firm* — Foley & Lardner LLP

(57) ABSTRACT

Systems and apparatuses include an asynchronous electrical machine coupled to an engine, a power supply selectively coupled to the electrical machine by a power supply switch device, and an electrical output coupled to the electrical machine by an output switch device. The electrical machine is structured to produce electricity when the power supply switch device is open, the output switch device is closed, and the electrical machine is mechanically driven by the engine, or perform as a starter motor to start the engine when the power supply switch device is closed, the output switch device is open, and the electrical machine mechanically drives the engine.

20 Claims, 7 Drawing Sheets

(51) Int. Cl.

| | | |
|---|---|---|
| *F02N 11/00* | (2006.01) | |
| *H02K 9/06* | (2006.01) | |
| *H02K 11/20* | (2016.01) | |
| *H02K 11/30* | (2016.01) | |
| *H02K 17/42* | (2006.01) | |
| *H02K 47/20* | (2006.01) | |

(52) U.S. Cl.
CPC ............ *H02K 11/20* (2016.01); *H02K 11/30* (2016.01); *H02K 17/42* (2013.01); *H02K 47/20* (2013.01)

(56) References Cited

U.S. PATENT DOCUMENTS

| | | | |
|---|---|---|---|
| 4,417,194 A * | 11/1983 | Curtiss | H02J 3/1835 322/29 |
| 4,548,164 A | 10/1985 | Ylonen et al. | |
| 6,066,935 A | 5/2000 | Eisele | |
| 6,285,178 B1 * | 9/2001 | Ball | H02P 1/26 318/137 |
| 6,450,133 B1 | 9/2002 | Bernard et al. | |
| 6,452,769 B1 | 9/2002 | Sohde et al. | |
| 6,895,903 B2 | 5/2005 | Campion | |
| 7,599,171 B1 * | 10/2009 | Remmert | H02J 9/062 307/64 |
| 8,037,966 B2 | 10/2011 | Errera et al. | |
| 8,450,864 B2 | 5/2013 | Kawakita et al. | |
| 8,677,948 B2 | 3/2014 | Steffi | |
| 8,680,728 B2 | 3/2014 | Errera et al. | |
| 8,816,518 B2 | 8/2014 | Campion et al. | |
| 8,922,033 B2 | 12/2014 | Vallinayagam et al. | |
| 9,957,708 B2 | 5/2018 | Brewer et al. | |
| 10,079,526 B2 | 9/2018 | Shatek et al. | |
| 10,132,224 B2 | 11/2018 | Jenison et al. | |
| 10,202,896 B2 | 2/2019 | Brewer et al. | |
| 11,125,156 B2 | 9/2021 | Zhang et al. | |
| 2003/0029390 A1 | 2/2003 | Campion | |
| 2003/0030246 A1 | 2/2003 | Campion | |
| 2003/0030279 A1 | 2/2003 | Campion | |
| 2003/0030281 A1 | 2/2003 | Campion | |
| 2003/0033994 A1 | 2/2003 | Campion | |
| 2006/0006652 A1 | 1/2006 | Witten et al. | |
| 2009/0295169 A1 * | 12/2009 | Usselman | F02N 11/0862 290/1 A |
| 2009/0321180 A1 | 12/2009 | Errera et al. | |
| 2011/0057454 A1 | 3/2011 | Kawakita et al. | |
| 2012/0102929 A1 | 5/2012 | Beissler et al. | |
| 2012/0122981 A1 | 5/2012 | Hu et al. | |
| 2012/0125029 A1 | 5/2012 | Moreau | |
| 2012/0211981 A1 | 8/2012 | De Wergifosse | |
| 2013/0032310 A1 * | 2/2013 | Jaena | H05K 7/1497 165/138 |
| 2014/0210214 A1 * | 7/2014 | Campion | H02K 15/14 290/1 A |
| 2015/0292435 A1 | 10/2015 | Yamanaka et al. | |
| 2016/0319728 A1 | 11/2016 | Jenison et al. | |
| 2016/0369689 A1 | 12/2016 | Brewer et al. | |
| 2016/0376976 A1 * | 12/2016 | McAndrew | F01P 1/06 123/41.57 |
| 2018/0354712 A1 | 12/2018 | Goleczka et al. | |
| 2019/0115758 A1 * | 4/2019 | Orban | E21B 3/022 |
| 2019/0128230 A1 | 5/2019 | Ihde | |
| 2019/0249913 A1 | 8/2019 | Gongate et al. | |
| 2023/0303316 A1 | 9/2023 | Yan et al. | |

FOREIGN PATENT DOCUMENTS

| | | |
|---|---|---|
| CN | 101583865 A | 11/2009 |
| CN | 101911103 A | 12/2010 |
| CN | 104712485 A | 6/2015 |
| CN | 205779249 U | 12/2016 |
| CN | 110056440 A | 7/2019 |
| CN | 110086390 A | 8/2019 |
| CN | 110469401 A | 11/2019 |
| CN | 209990550 U | 1/2020 |
| CN | 210660310 U | 6/2020 |

OTHER PUBLICATIONS

International Search Report and Written Opinion on PCT/US2021/044697 Dtd Nov. 8, 2021, 10 pages.
International Search Report and Written Opinion on PCT/US2021/044686 Dtd Nov. 30, 2021, 13 pages.
Examination Report in AU Application No. 2021332038, dated May 30, 2024, 4 pgs.
Fitzgerald et al., "Synchronous Machines," in Electrical Machines (6th ed.), McGraw-Hill Education, Jan. 2003, pp. 245-246.
Wikipedia Contributors, "Alternator," in Wikipedia, The Free Encyclopedia, Jul. 31, 2024, retrieved on Aug. 7, 2024, from https://en.wikipedia.org/w/index.php?title=Alternator&oldid=1237702158, 8 pgs.

* cited by examiner

SYSTEM FOR A GENERATOR SET

CROSS REFERENCE TO RELATED APPLICATIONS

This application claims priority to Chinese Utility Model Patent Application No. 2020218291159, filed on Aug. 27, 2020, the entire contents of which are incorporated by reference herein.

TECHNICAL FIELD

The present disclosure relates to generator sets. More particularly, the present disclosure relates to systems for containerized generator sets.

BACKGROUND

Generator sets typically include many components or subsystems coupled together. For example, typical generator sets include an engine, an alternator, a cooling system for cooling the engine, and an aftertreatment system for treating exhaust gases produced by the engine. Some generator sets include an engine positioned within a housing. In such situations, an external exhaust system is coupled to the outside of the housing, increasing the space required by the generator set.

High Voltage (HV) generator sets that use mechanically driven radiator fans and/or fixed speed fans consume more power than generator sets that utilize multiple electrical driven fans. The reliability of a system employing a single mechanical fan is lower than a generator set that employs multiple electrical fans. HV generator sets cannot supply power for operation of electrically driven radiator fans, and require the end user to provide an additional low voltage (LV) power supply or a step down transformer to provide 400V LV power. Typical systems can include a step down transformer 10 kV/400V but these systems require more equipment and a bigger footprint (e.g., occupy more space) while adding significantly to system complexity.

SUMMARY

One embodiment relates to an asynchronous induced low voltage electrical machine coupled to an engine, an excitation capacitor selectively coupled to the electrical machine by a capacitor switch device, a power supply selectively coupled to the electrical machine by a power supply switch device and controlled by a variable frequency drive, and an electrical output coupled to the electrical machine by an output switch device. The electrical machine is structured to: produce electricity when the capacitor switch device is closed, the power supply switch device is open, the output switch device is closed, and the electrical machine is mechanically driven by the engine, or perform as a starter motor to start the engine when the capacitor switch device is open, the power supply switch device is closed, the output switch device is open, and the electrical machine mechanically drives the engine.

Another embodiment relates to a system for a generator set that includes an asynchronous electrical machine coupled to an engine, a power supply selectively coupled to the electrical machine by a power supply switch device, and an electrical output coupled to the electrical machine by an output switch device. The electrical machine is structured to produce electricity when the power supply switch device is open, the output switch device is closed, and the electrical machine is mechanically driven by the engine, or perform as a starter motor to start the engine when the power supply switch device is closed, the output switch device is open, and the electrical machine mechanically drives the engine.

Another embodiment relates to a method of operating a system of generator set including an asynchronous induced low voltage electrical machine coupled to an engine, an excitation capacitor selectively coupled to the electrical machine by a capacitor switch device, a power supply selectively coupled to the electrical machine by a power supply switch device and controlled by a variable frequency drive, and an electrical output coupled to the electrical machine by an output switch device. The method includes producing electricity with the electrical machine by closing the capacitor switch device, opening the power supply switch device, closing the output switch device, and mechanically driving the electrical machine with the engine. The method also includes providing mechanical energy to the engine from the electrical machine to start the engine by opening the capacitor switch device, closing the power supply switch device, opening the output switch device, and mechanically driving the engine with the electrical machine.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Following below are more detailed descriptions of various concepts related to, and implementations of, methods, apparatuses, and systems for a containerized generator set. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various embodiments disclosed herein relate to systems, apparatuses, and methods for a generator set contained within an International Organization for Standardization (ISO) standard shipping container, such as containers in compliance with the ISO 45G1 (1995), ISO42V0 (1995) or ISO42G0 (1995) standards. The containerized generator set defines separate rooms within the ISO standard shipping container to strategically separate the functions of the generator set to provide improved generator set operation in a restricted volume. Typically, generator sets require the addition of external components (e.g., exhaust systems, fuel systems, etc.) that increase complexity of on-site commissioning, increase the volume occupied by the commissioned generator set, and increase shipping costs to provide the generator set to the final location.

Figure 1:
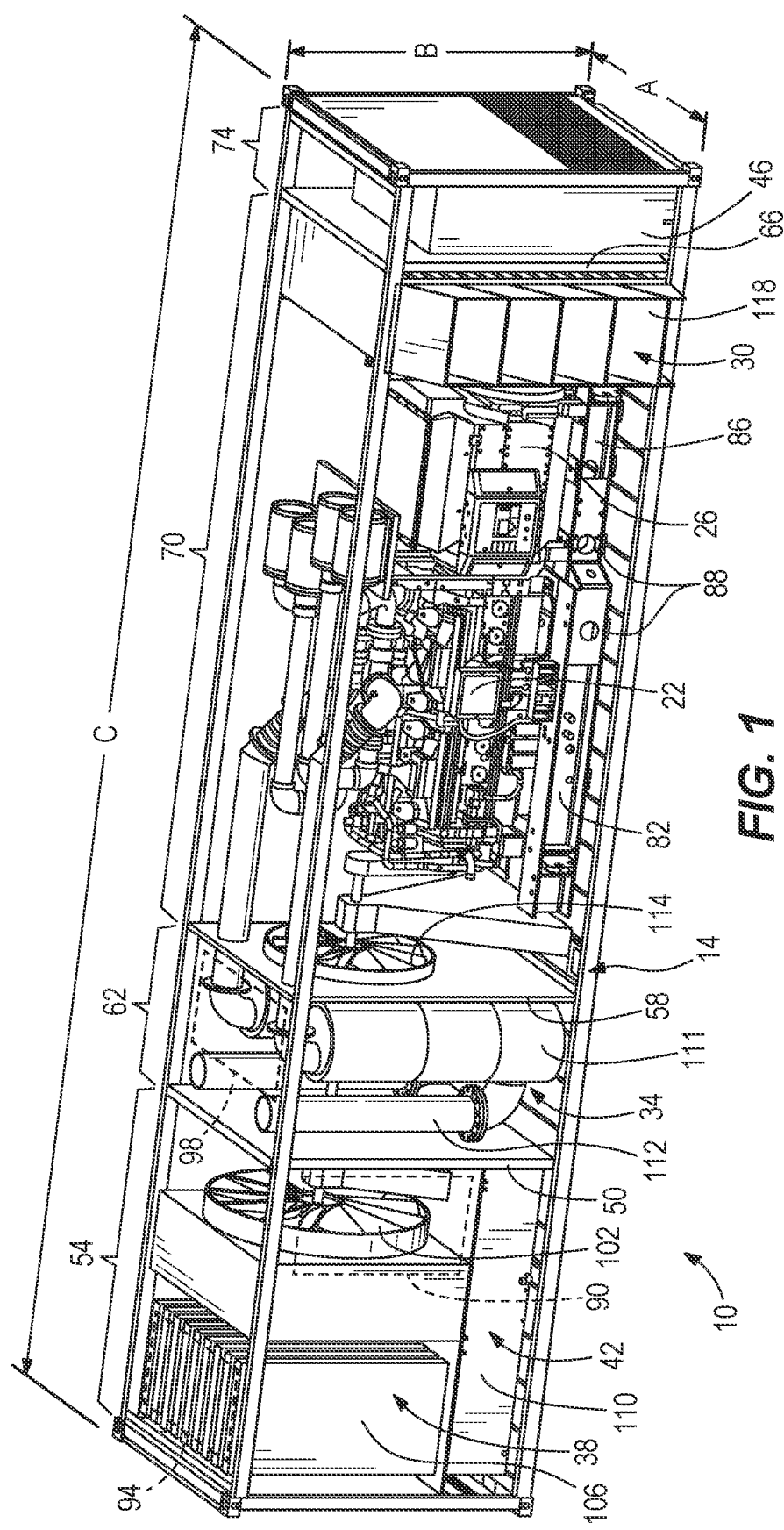
FIG. 1 is a perspective view of a generator set according to some embodiments.
Figure 2:
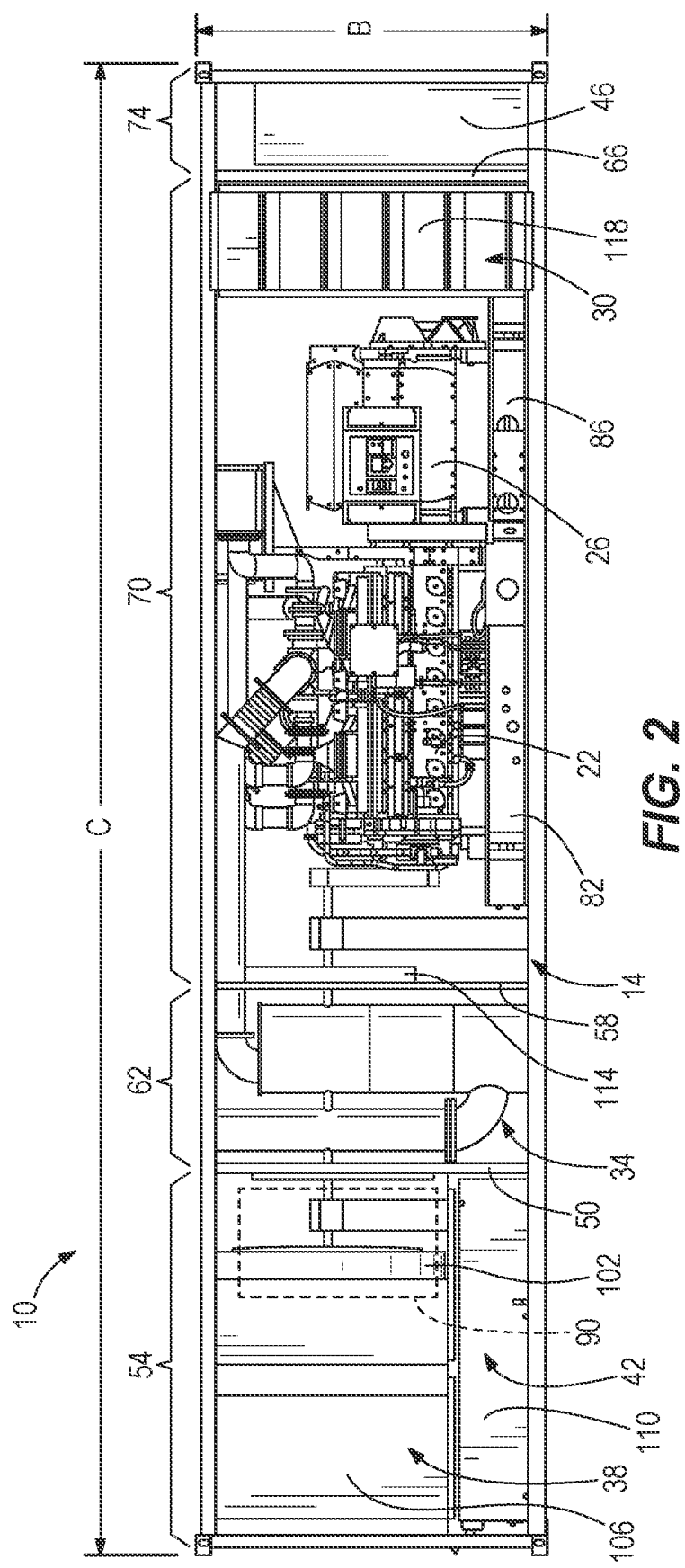
FIG. 2 is a right side view of the generator set of FIG. 1.

As shown in FIGS. 1 and 2, a generator set 10 includes a housing 14, an engine 22, an alternator 26 connected to the engine 22 to receive mechanical power from the engine 22 and produce electrical power, an air intake system 30 that provides fresh air to the engine 22 and the alternator 26, an aftertreatment system 34 that receives and treats exhaust from the engine 22, a cooling system 38 that cools the engine 22, a fuel system 42 that provides fuel to the engine 22, and a control system 46 that controls operation of the generator set 10.

The housing 14 includes a first end wall, a second end wall distal from the first end wall, a first side wall extending between the first end wall and the second end wall, a second side wall distal from the first side wall and extending between the first end wall and the second end wall, a floor, and a roof. The housing 14 defines standard ISO container dimensions including a container width A of 2.44 meters between the first side wall and the second side wall, a container height B of 2.59 meters or 2.90 meters between the roof and the floor, and a container length C of 12.2 meters between the first end wall and the second end wall. Using standardized dimensions in accordance with ISO requirements facilitates integration with external components and enhances the ease of transport and replacement.

The housing 14 includes a cooling room wall 50 that defines a cooling room 54 between the first end wall of the housing 14 and the cooling room wall 50, an exhaust room wall 58 that defines an exhaust room 62 between the cooling room wall 50 and the exhaust room wall 58, and an air intake system wall 66 that defines an engine room 70 between the air intake system wall 66 and the exhaust room wall 58. A control room 74 is defined between the air intake system wall 66 and the second end wall of the housing 14.

The cooling room wall 50 inhibits airflow and heat transfer between the cooling room 54 and the exhaust room 62. The cooling room 54 is sized to fully contain the cooling system 38 and the fuel system 42 so that the cooling system 38 and the fuel system 42 do not extend beyond the dimensions of the housing 14. The cooling room 54 defines a cooling air intake 90 that receives ambient temperature air and ambient air pressure from the environment, and a cooling air outlet 94 that exhausts air that exits the cooling room 54.

An exhaust room 62 is sized to fully contain the aftertreatment system 34 so that the aftertreatment system 34 does not extend beyond the dimensions of the housing 14 or require additional, external components. The exhaust room 62 defines an exhaust air outlet 98 that exhaust air that has passed through the engine room 70 and the exhaust room 62.

The engine room 70 includes a generator set skid in the form of an engine skid 82 and an alternator skid 86. In some embodiments, the engine skid 82 and the alternator skid 86 are rigidly tied together or formed as a single skid. In some embodiments, the engine skid 82 and the alternator skid 86 are separate and allow movement therebetween. For example, the connection between the engine skid 82 and the alternator skid 86 may be arranged to reduce the transference of vibration from the engine 22 to the alternator 26. The engine skid 82 and the alternator skid 86 are structured to carry the loads produced by the engine 22 and the alternator 26 which can often be substantial. The engine skid 82 and the alternator skid 86 are mounted to the floor of the housing 14 so as to transfer loads to the ground without causing adverse distortion of the housing 14. In some embodiments, the engine skid 82 and the alternator skid 86 are mounted to the floor of the housing 14 via dampers 88 to reduce the transmission of vibrations.

The engine room 70 is sized to fully contain the engine 22, the alternator 26, and the air intake system 30 so that the engine 22, the alternator 26, and the air intake system 30 do not extend beyond the dimensions of the housing 14 when the generator set 10 is arranged in a shipping configuration.

The air intake system wall 66 inhibits airflow and heat transfer between the engine room 70 and the control room 74. The control room 74 is sized to fully contain the control system 46 so that the control system 46 does not extend beyond the dimensions of the housing 14.

The cooling system 38 is positioned within the cooling room 54 and cools the engine 22. In some embodiments, the cooling system includes a radiator fan 102 that is mechanically driven via a driveshaft by the engine 22. The mechanically driven radiator fan 102 can include a drive system, such as a gearbox or belt system, for modifying an engine output speed to provide the desired driving speed for the radiator fan 102. The radiator fan 102 is positioned to provide ambient temperature and pressure air from the cooling air intake 90 to a radiator core 106. In this manner, such embodiments may reduce the extent of temperature increases at the radiator core 106.

The fuel system 42 includes a fuel tank 110 positioned within the cooling room 54 and fuel handling actuators, pumps, and other components for delivering fuel to the engine 22. In some embodiments, the fuel system 42 is arranged adjacent the floor of the housing 14 and below the cooling system 38.

The aftertreatment system 34 (i.e., exhaust system) is positioned within the exhaust room 62 and treats the exhaust emissions produced by the engine 22. In some embodiments, the aftertreatment system 34 includes a muffler 111 and an exhaust pipe 112. In some embodiments, the aftertreatment system 34 includes an exhaust gas recirculation system, a selective catalyst reduction system, a particulate filtration system, and/or other aftertreatment components. In some embodiments, components of the aftertreatment system 34 are distributed between the exhaust room 62 and the engine room 70. In some embodiments, only the muffler 111 and exhaust pipe 112 may be positioned within the exhaust room.

The aftertreatment system 34 also includes a ventilation system in the form of an exhaust fan 114 providing air flow from the engine room 70 into the exhaust room 62 and out the exhaust air outlet 98. In some embodiments, the exhaust fan 114 is mechanically driven by the engine 22. The mechanically driven exhaust fan 114 can include a gearbox or belt system for modifying an engine output speed to provide the desired driving speed for the exhaust fan 114. The airflow provided by the exhaust fan 114 serves to expel heat build-up from the exhaust room 62. In some embodiments, such a configuration allows for a lower air flow for the engine room 70.

The engine 22 is mounted to the engine skid 82. In some embodiments, the engine 22 is an internal combustion engine (e.g., a diesel engine, a gasoline engine, a natural gas engine, etc.). The alternator 26 is mounted to the alternator skid 86 and receives mechanical power output from the engine 22. In some embodiments, the alternator 26 is a high voltage alternator and produces about 10 kV.

The air intake system 30 includes a louver 118 that is moveable between a retracted position when the generator set 10 is in the shipping arrangement and an extended position when the generator set 10 is in use. When the louver 118 is in the retracted position, the entirety of the louver 118 is arranged within the housing 14. When the louver 118 is arranged in the extended position, the louver 118 extends outside the housing 14. In some embodiments, the louver 118 slides horizontally perpendicular to the first side wall of the housing 14. For example, linear slides may support the louver 118 and a locking mechanism can be used to maintain the louver 118 in the retracted position or the extended position. In some embodiments, the louver 118 may include rotating plates that pivot between a closed or retracted position, and an open or extended position. In some embodiments, the air intake system 30 includes one louver assembly 118 positioned on the first side wall of the housing 14. In some embodiments, the air intake system 30 includes two substantially identical and mirrored louver assemblies 118 on the first side wall and the second side wall of the housing 14. The air intake system 30 and the louver 118 are actuatable on-site without the addition of external components. In some embodiments, the air intake system 30 includes noise mitigation structures (e.g., baffles, noise dampening material or insulation, etc.).

The louver 118 provides an intake airflow path to the engine room 70. The louver 118 receives ambient temperature and pressure air from the environment. In some embodiments, the louver 118 and the exhaust fan 114 are sized to provide an engine room airflow of about 8-10 m^3/s.

The control system 46 is structured to control operation of the engine 22 and the alternator 26 and includes a neutral grounding resistor (NGR). In some embodiments, the NGR is integrated with switchgear, a generator control unit, and/or other auxiliary equipment control components.

Figure 3:
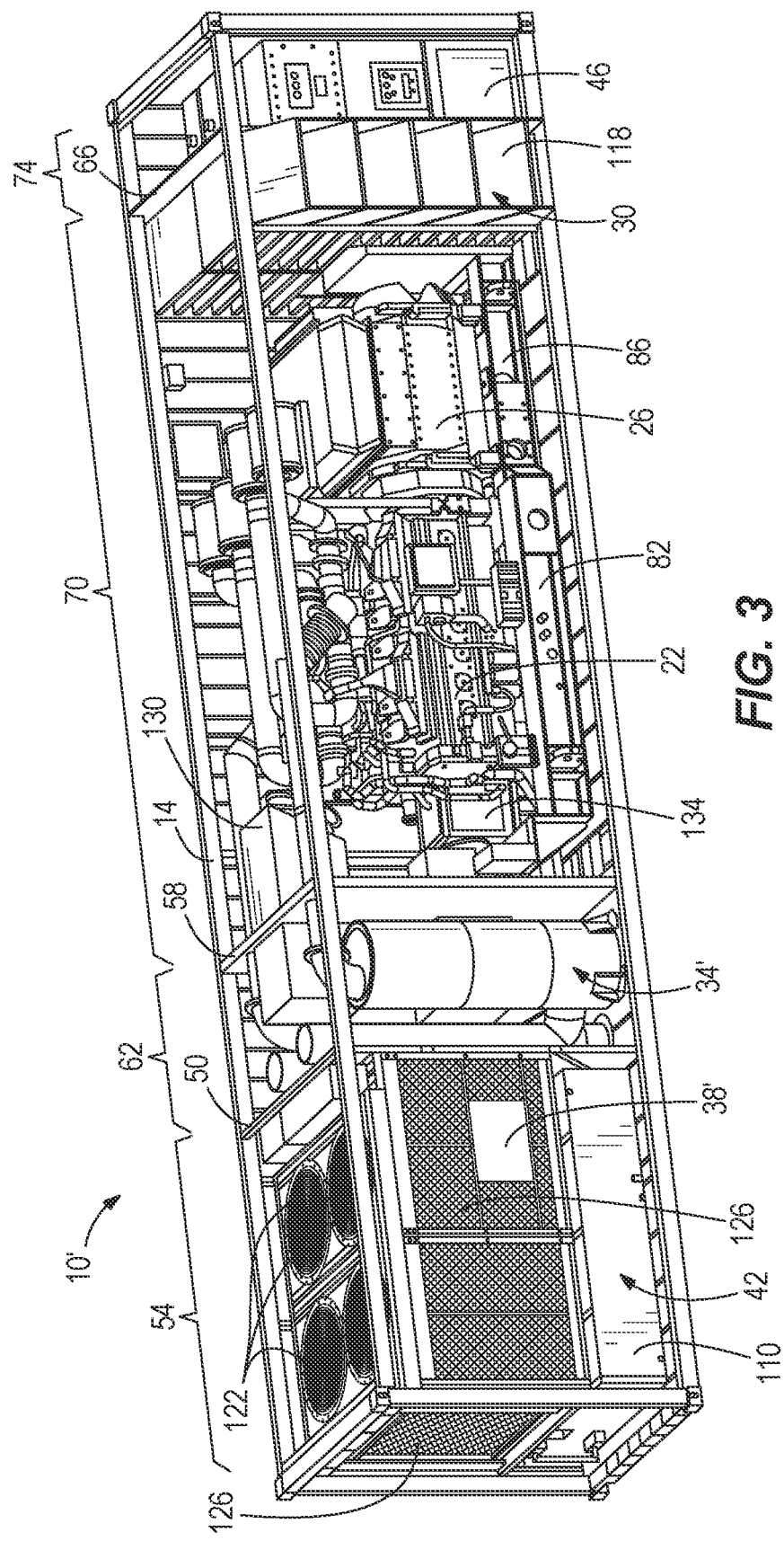
FIG. 3 is a perspective view of another generator set according to some embodiments.
Figure 4:
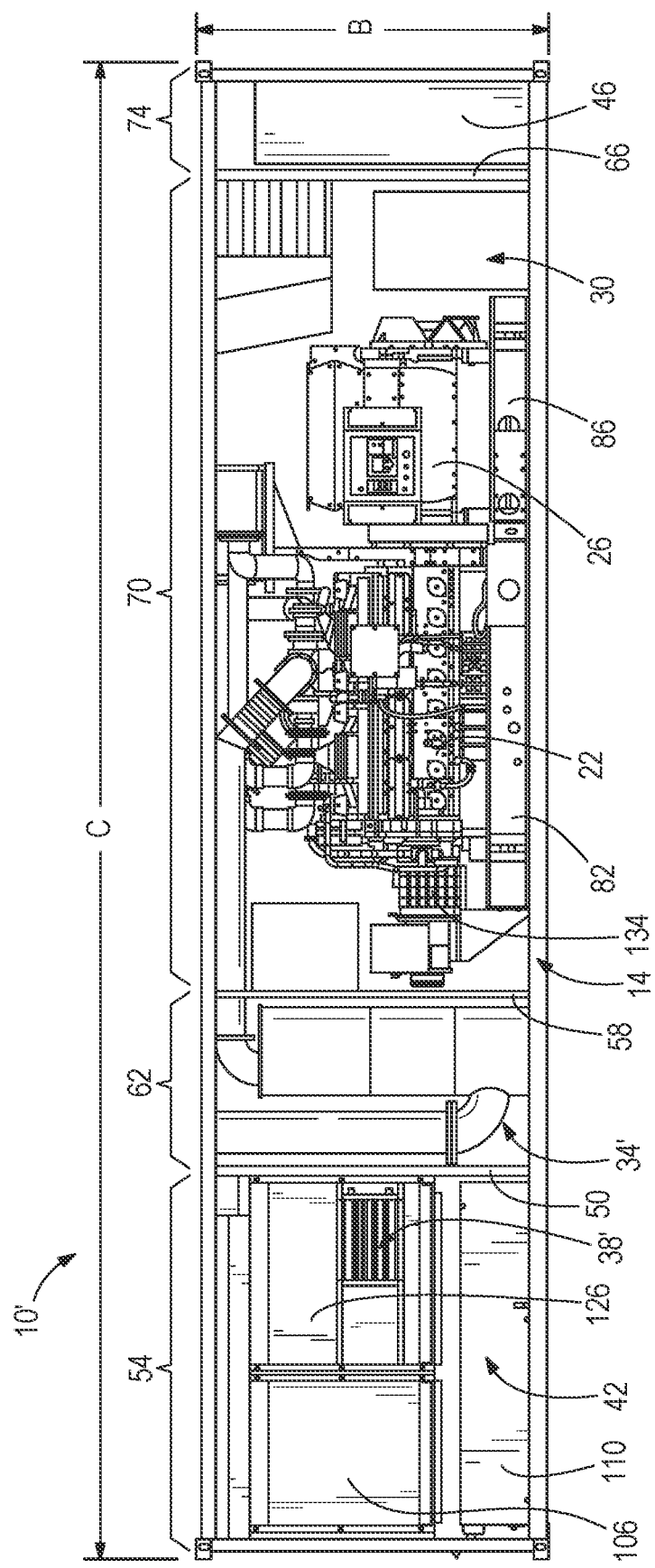
FIG. 4 is a right side view of the generator set of FIG. 1.

As shown in FIGS. 3 and 4, a generator set 10' that is similar to the generator set 10 discussed above with respect to FIGS. 1 and 2 and include a cooling system 38' and an aftertreatment system 34'. Similar systems and components have been numbered with like numbers.

Figure 5:
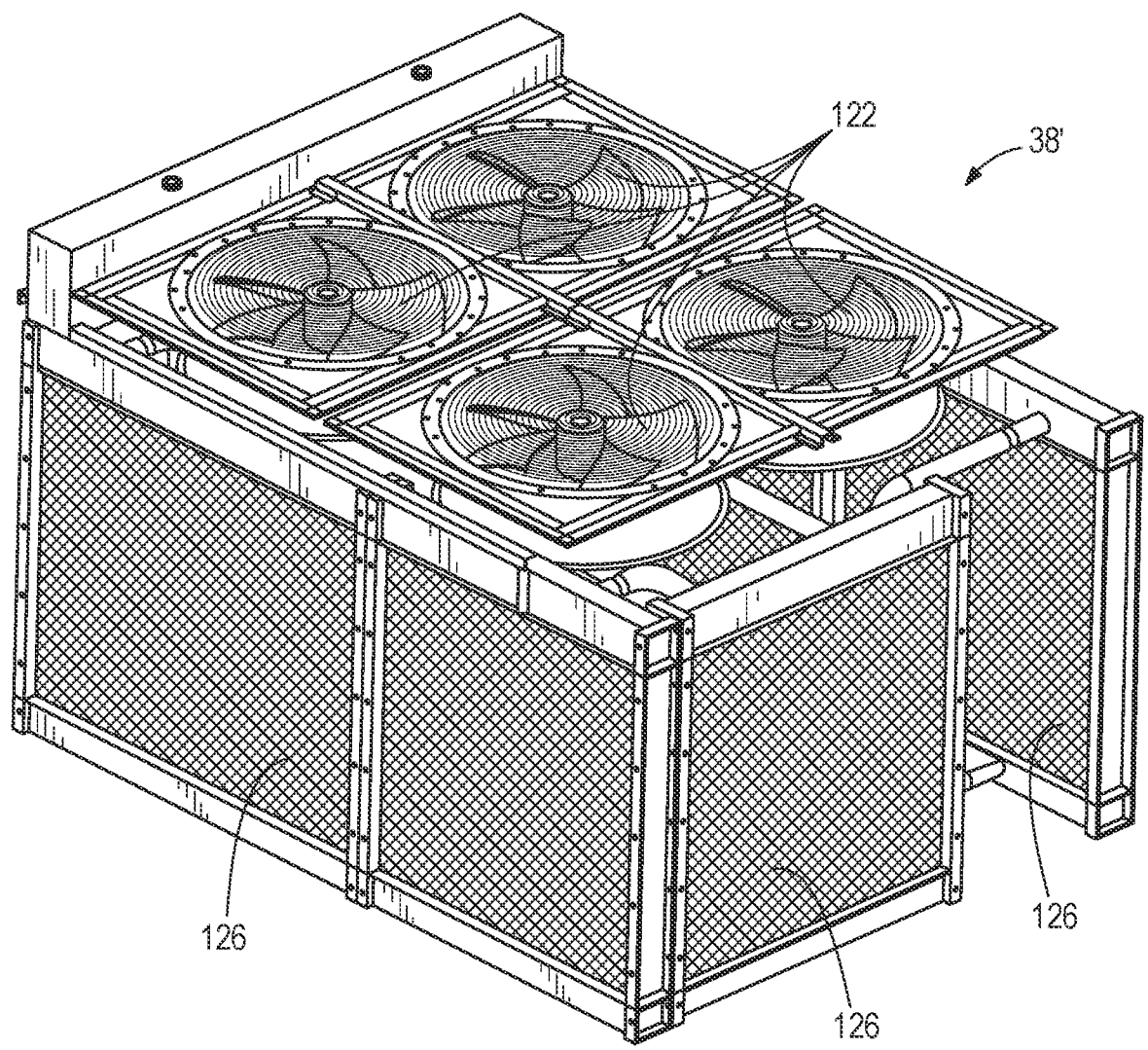
FIG. 5 is a perspective view of a cooling system of the generator set of FIG. 3 according to some embodiments.

As shown in FIG. 5, the cooling system 38' includes four electrically driven radiator fans 122. In some embodiments, the cooling system 38' includes more than four electrically driven radiator fans 122 or less than four electrically driven radiator fans 122. Radiator cores 126 are positioned so that the electrically driven radiator fans 122 provide a flow of air through the radiator cores 126. In some embodiments, the radiator cores 126 are arranged on the first end wall, the first side wall, and the second side wall of the housing 14, and the electrically driven radiator fans 122 are positioned adjacent the roof of the housing 14. In some embodiments, the cooling system 38' is located remote from the generator set 10' and includes a remote electrical radiator.

In some embodiments, the electrically driven radiator fans 122 consume between twenty and thirty kilowatt-electric (20-30 kWe) and the mechanical radiator fan 102 consumes between fifty and seventy kilowatt-mechanical (50-70 kWm).

The aftertreatment system 34' includes an electrically driven exhaust fan 130 arranged to provide airflow from the engine room 70 into the exhaust room 62. In some embodiments, the airflow through the engine room 70 is reduced compared to typical generator set designs because the airflow through the engine room 70 is not required to pass through the radiator cores 106, 126. For example, in a typical generator set, an airflow of thirty-five to forty-five cubic meters per second (35-45 m^3/s) may be common, while the generator sets 10, 10' described herein may have an airflow through the engine room 70 of about eight to ten cubic meters per second (8-10 m^3/s).

In some embodiments, the electrically driven exhaust fan 130 can be positioned within the engine room 70. For example, the electrically driven exhaust fan 130 may be placed within or adjacent to the air intake system 30 or may replace the air intake system 30 so that the electrically driven exhaust fan 130 pushes air through the engine room 70, into the exhaust room 62 and out the exhaust air outlet 98.

The separation of rooms within the housing 14 allows the components of the generator set 10, 10' to operate successfully while allowing the generator set 10, 10' to be shipped and moved economically, and commissioned on-site with little effort and while consuming a minimum space claim.

As shown in FIGS. 3 and 4, the generator set 10' may also include an auxiliary alternator or generator 134 powered by the engine 22 and structured to produce electrical power for the four electrically driven radiator fans 122 and the exhaust fan 130. In some embodiments, the auxiliary generator 134 is driven from an opposite end of the engine 22 than the alternator 26. In some embodiments, the auxiliary generator 134 is a low voltage synchronous generator driven by the engine 22 to provide 50 Hz 400V electricity and power the cooling system 38' and the aftertreatment system 34'. In some embodiments, such a configuration contributes to lower power consumption by the fans. The auxiliary generator 134 can be driven directly by an output shaft of the engine 22 or by a transmissions system (e.g., a belt, chain, or gear drive). In some embodiments, the engine 22 is connected to the auxiliary generator 134 by a flexible coupling or by a direct connection. In systems without the auxiliary generator 134, a step down transformer is required to provide low voltage power and such systems require a larger space claim (that is, such systems occupy more space) or footprint. Systems without the auxiliary generator 134 can include engine driven fans for the aftertreatment system 34 or other ventilation systems, and/or the radiator fans(s). Additionally, step down transformer systems are complex and can introduce points of failure.

Figure 6:
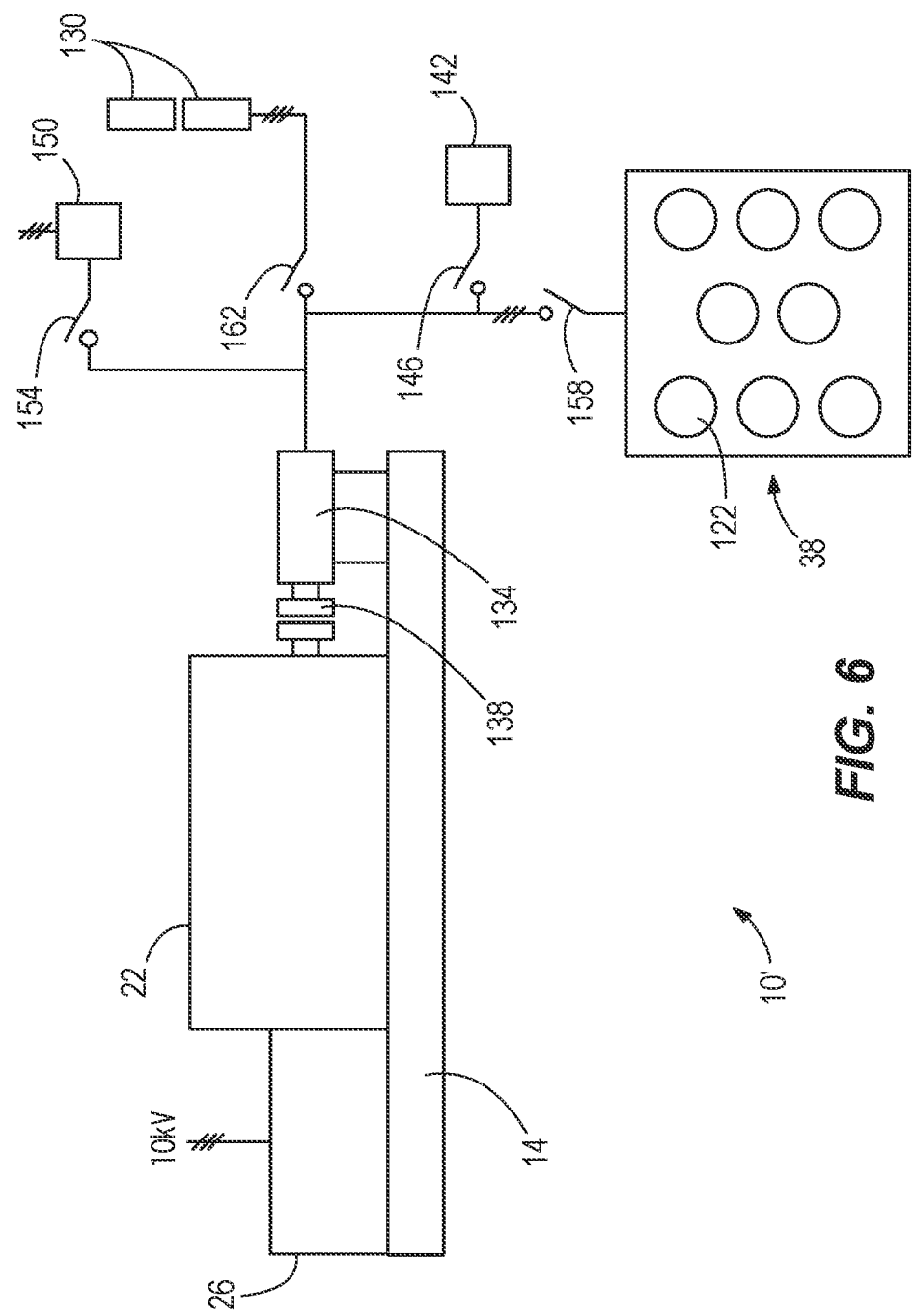
FIG. 6 is a schematic representation of the generator set of FIG. 3 according to some embodiments.

As shown in FIG. 6, the auxiliary generator 134 includes an asynchronous induced low voltage electrical machine coupled to the engine 22 by a mechanical coupler 138 in the form of a gearbox, a belt, a direct drive or another suitable coupling to transfer mechanical movement between the auxiliary generator 134 and the engine 22.

The auxiliary generator 134 is driven by the engine 22 and serves as an asynchronous alternator to supply power to the cooling system 38' and the aftertreatment system 34'. In some embodiments, the mechanical coupler 138 drives the auxiliary generator 134 directly and the auxiliary generator 134 provides less than 50 Hz with a terminal voltage of 380-400 V (or 220 V). While the provided power is less than 50 Hz, the radiator fans 122 and exhaust fan 130 are still accelerated to achieve desired airflows. In some embodiments, the mechanical coupler 138 includes an effective gear ratio (e.g., by a gear train, a belt system, etc.) and the auxiliary generator 134 provides 50 Hz. In some embodiments, the auxiliary generator 134 provides a capacity of 50 kW. The asynchronous auxiliary generator 134 does not require a synchronization controller, thereby reducing complexity, cost, and the likelihood of failure.

The asynchronous auxiliary generator 134 is coupled to the engine 22 so as to act as a reserve starter motor. In the event that a primary starter motor of the engine 22 fails, the asynchronous auxiliary generator 134 can be used to start the generator set 10'.

The generator set 10' also includes an excitation capacitor 142 coupled to the auxiliary generator 134 by a capacitor switch device 146, an uninterruptable power supply 150 coupled to the auxiliary generator 134 by a power supply switch device 154, a first electrical output in the form of a cooling system switch device 158, and a second electrical output in the form of a aftertreatment system switch device 162.

The excitation capacitor 142 is capable of storing and providing excitation to the auxiliary generator 134 without the use of a typical excitation system which include electrical components that often lead to failure. The capacitor switch device 146 can include a micro switch, a contactor, a fuse, or another switching device.

The uninterruptable power supply 150 (e.g., a battery bank) is structured to provide power to the auxiliary generator 134. In some embodiments, the power supply 150 includes a variable frequency drive structured to provide power to and control operation of the asynchronous auxiliary generator 134 as a starter motor. The power supply switch device 154 can include a micro switch, a contactor, a fuse, or another switching device.

The power output by the asynchronous generator 134 can be used to provide power to systems of the generator set 10'. For example, the cooling system switch device 158 can selectively provide power to the electrically driven radiator fans 122 and other components of the cooling system 38'. The aftertreatment system switch device 162 can selectively provide power to the electrically driven exhaust fan(s) 130. The output switch devices 146, 162 can include a micro switch, a contactor, a fuse, or another switching device. When other auxiliary equipment requires power of 50 Hz and 400V, an AC-AC convertor can be utilized.

Figure 7:
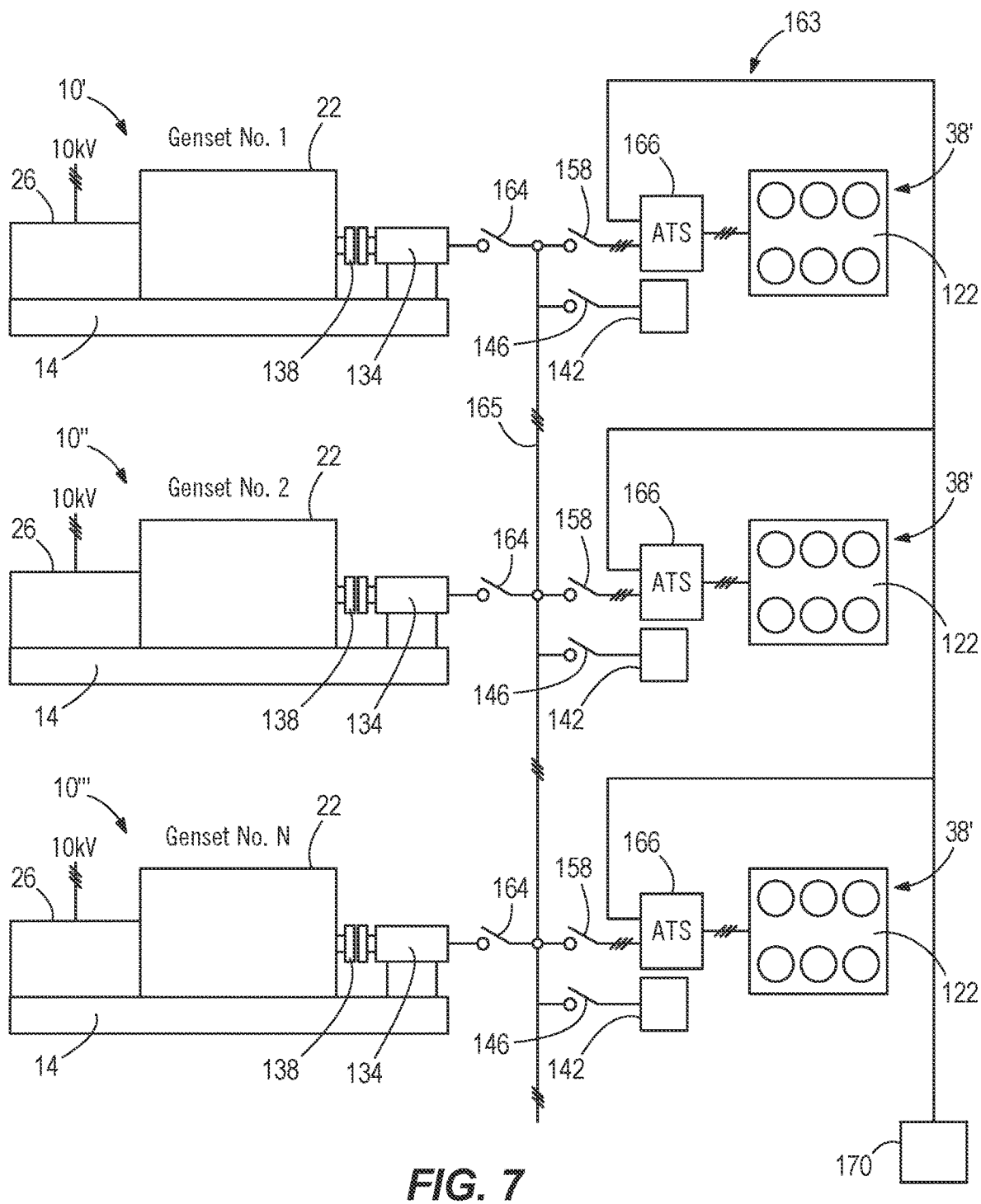
FIG. 7 is a schematic view of a parallel system including the generator set of FIG. 3 according to some embodiments.

As shown in FIG. 7, the generator set 10' can be integrated into a parallel system 163 with a second generator set 10" and a third generator set 10'''. In some embodiments, the parallel system 163 can include two, or more than three generator sets. In the parallel system 163, each generator set 10', 10", 10''' includes an output switch 164 selectively coupling the respective generator set 10', 10", 10''' to a parallel bus 165. Each associated excitation capacitor 142 and capacitor switch device 146 are also coupled to the parallel bus 165. One advantage provided by a system that utilizes the parallel bus 165 includes the ability to increase reliability. In a situation where a local auxiliary generator 134 fails, power can still be provided to the associated radiator fans 122 and the generator set 10 can remain in service and producing power. In some embodiments, the auxiliary generator 134 from the first generator set 10' can provide power to the radiator fans 122 of the second generator set 10".

Each auxiliary generator 134 is structured to selectively provide electricity to the parallel bus 165. In some embodiments, the parallel system 163 includes a system controller that can be used to control the alternator output power supplies 150 and the alternator excitation capacitors 142 and by this way achieve the system paralleling. The system controller may include a microcontroller, e.g., a microcomputer having a non-volatile memory and configured to store instructions, which, when executed by a processor of the microcomputer, cause the system controller to carry out operations to control one or more of the utility power supply 170 and/or the bus 165.

An automatic transfer switch (ATS) 166 is associated with each generator set 10', 10", 10''' and selectively provides power to each cooling system 38' from either the parallel bus 165 via the cooling system switch device 158, or a utility power supply 170. The inclusion of the ATS 166 and utility power supply 170 improves the reliability of the cooling system 38'. In some embodiments, the aftertreatment systems 34' or other systems of the generator set 10' are arranged to receive power from the utility power supply 170.

In some embodiments, the aftertreatment system 34, the cooling system 38, the air intake system 30, and the control system 46 are generically described as systems attached to the engine 22 or alternator 26 of the generator set 10. In some embodiments, other systems, components, or structures can be attached to the engine 22 or alternator 26 of the generator set 10.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical or electrical. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of steps, the order of such steps may differ from what is depicted and described, unless specified differently above. Also, two or more steps may be performed concurrently or with partial concurrence, unless specified differently above. Such variation may depend, for example, on the software and hardware systems chosen and on particular technical specifications. All such variations are within the scope of the disclosure. Likewise, software implementations of the described operations could be accomplished with standard programming techniques with rule-based logic and other logic to accomplish processing and/or control steps.

It is important to note that the construction and arrangement of the generator sets as shown in the various exemplary embodiments is illustrative only. Additionally, any element disclosed in one embodiment may be incorporated or utilized with any other embodiment disclosed herein. For example, the electrically driven radiator fans 122 of the exemplary embodiment of FIG. 5, for example, may be incorporated in the generator set 10 of one or more exemplary embodiments as shown in FIGS. 1 and 2. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system for a generator set comprising:
   an asynchronous electrical machine coupled to an engine;
   an excitation capacitor selectively coupled to the asynchronous electrical machine by a capacitor switch device;
   a power supply selectively coupled to the electrical machine by a power supply switch device; and
   an electrical output coupled to the electrical machine by an output switch device,
   wherein the electrical machine is structured to:
      perform as a starter motor to start the engine when the capacitor switch device is open, the power supply switch device is closed, the output switch device is open, and the electrical machine mechanically drives the engine.

2. The system of claim 1, wherein:
   the asynchronous electrical machine is an asynchronous induced low voltage electrical machine, and
   the power supply is controlled by a variable frequency drive.

3. The system of claim 1, wherein the electrical output is a remote electrical radiator of the generator set driven by the electricity produced by the electrical machine.

4. The system of claim 3, wherein the remote electrical radiator includes a plurality of electrically driven fans.

5. The system of claim 3, further comprising an automatic transfer switch defining a first input coupled to the output switch device, a second input coupled to a utility grid supplying electrical power, and an output coupled to the remote electrical radiator.

6. The system of claim 1, further comprising a system controller structured to control the capacitor switch device and the output switch device to provide system paralleling to build a micro paralleling system with multiple asynchronous electrical machines.

7. The system of claim 1, wherein the electrical output is a ventilation fan of the generator set driven by the electricity produced by the electrical machine.

8. The system of claim 7, wherein the ventilation fan includes a plurality of ventilation fans for providing air flow to the generator set.

9. The system of claim 1, wherein the electrical machine is configured to supply less than 50 Hz power when directly coupled to an engine crankshaft, and to provide 50 Hz power when driven by a belt and pulley system.

10. The system of claim 9, further comprising an AC-AC converter configured such that when 50 Hz power is not provided by the electrical machine, the AC-AC converter receives electricity from the electrical machine and provides 50 Hz power.

11. The system of claim 1, wherein the electrical machine provides between 380 and 400 volts.

12. The system of claim 1, wherein the electrical machine provides 220 volts.

13. The system of claim 1, further comprising a primary starter motor, wherein the electrical machine performs as a backup starter motor.

14. The system of claim 1, wherein the capacitor switch device is a micro switch.

15. The system of claim 1, wherein the capacitor switch device is a contactor.

16. The system of claim 1, wherein the capacitor switch device is a fuse.

17. The system of claim 2, further comprising a second asynchronous induced low voltage electrical machine coupled to a second engine, the asynchronous induced low voltage electrical machine and the second asynchronous induced low voltage electrical machine structured to be connected to a parallel bus in parallel.

18. The system of claim 1, wherein the electrical machine is structured to produce electricity when the capacitor switch device is closed.

19. A method of operating a system of generator set including an asynchronous induced low voltage electrical machine coupled to an engine, an excitation capacitor selectively coupled to the electrical machine by a capacitor switch device, a power supply selectively coupled to the electrical machine by a power supply switch device and controlled by a variable frequency drive, and an electrical output coupled to the electrical machine by an output switch device,
   the method comprising:
      producing electricity with the electrical machine by
         closing the capacitor switch device,
         opening the power supply switch device,
         closing the output switch device, and
         mechanically driving the electrical machine with the engine; and
      providing mechanical energy to the engine from the electrical machine to start the engine by
         opening the capacitor switch device,
         closing the power supply switch device,
         opening the output switch device, and
         mechanically driving the engine with the electrical machine.

20. The method of claim 19, wherein producing electricity with the electrical machine further includes driving a remote electrical radiator of the generator set with the produced electricity.

* * * * *